(12) United States Patent
Oyobe et al.

(10) Patent No.: US 7,688,604 B2
(45) Date of Patent: Mar. 30, 2010

(54) AC VOLTAGE OUTPUT APPARATUS AND HYBRID VEHICLE INCLUDING THE SAME

(75) Inventors: Hichirosai Oyobe, Toyota (JP);
Tetsuhiro Ishikawa, Nishikamo-gun (JP); Yukihiro Minezawa, Anjo (JP);
Shigenori Togashi, Sagamihara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 343 days.

(21) Appl. No.: 11/919,072

(22) PCT Filed: Jun. 22, 2006

(86) PCT No.: PCT/JP2006/312950

§ 371 (c)(1),
(2), (4) Date: Oct. 23, 2007

(87) PCT Pub. No.: WO2006/137590

PCT Pub. Date: Dec. 28, 2006

(65) Prior Publication Data

US 2009/0224720 A1    Sep. 10, 2009

(30) Foreign Application Priority Data

Jun. 24, 2005    (JP)    ............................. 2005-185184

(51) Int. Cl.
*H02M 1/12* (2006.01)
*H02P 27/04* (2006.01)

(52) U.S. Cl. ............................. 363/40; 363/41; 318/34; 318/811

(58) Field of Classification Search ................. 318/4–8, 318/34, 47, 53, 93, 95, 105, 110–112, 139, 318/205, 440, 802, 803, 811; 363/34, 71, 363/40, 41, 65, 98, 120
See application file for complete search history.

(56) References Cited

U.S. PATENT DOCUMENTS 3,775,663 A    11/1973    Turnbull (Continued)

FOREIGN PATENT DOCUMENTS

EP    0 493 848 A2    7/1992

(Continued)

*Primary Examiner*—Walter Benson
*Assistant Examiner*—Eduardo Colon-Santana
(74) *Attorney, Agent, or Firm*—Oliff & Berridge, PLC

(57) ABSTRACT

A first inverter control unit includes a harmonic generation unit. The harmonic generation unit generates a harmonic voltage instruction having a phase opposite to a harmonic generated at a neutral point of a motor-generator when the motor-generator revolves, based on motor revolution number of the motor-generator. A PWM signal generation unit generates a signal based on a voltage instruction obtained by superimposing an AC voltage instruction from an AC output control unit and the harmonic voltage instruction from the harmonic generation unit onto each voltage instruction of U-phase, V-phase and W-phase from a conversion unit.

17 Claims, 9 Drawing Sheets

U.S. PATENT DOCUMENTS

| | | | |
|---|---|---|---|
| 4,652,989 A * | 3/1987 | Kurosawa et al. | 363/161 |
| 5,099,186 A * | 3/1992 | Rippel et al. | 318/803 |
| 5,321,599 A * | 6/1994 | Tanamachi et al. | 363/41 |
| 5,446,643 A * | 8/1995 | McMurray | 363/40 |
| 5,852,558 A | 12/1998 | Julian et al. | |
| 5,949,221 A * | 9/1999 | Edwards | 323/209 |
| 5,984,173 A * | 11/1999 | Edwards | 323/207 |
| 6,431,297 B1 * | 8/2002 | Nakazawa | 180/65.6 |
| 2003/0090232 A1 | 5/2003 | Ho | |
| 2009/0067205 A1 * | 3/2009 | Oyobe et al. | 363/98 |
| 2009/0159348 A1 * | 6/2009 | Oyobe et al. | 180/65.21 |

FOREIGN PATENT DOCUMENTS

| | | |
|---|---|---|
| EP | 0 555 557 A1 | 8/1993 |
| EP | 1 246 353 A2 | 10/2002 |
| JP | A-02-261063 | 10/1990 |
| JP | A-04-295202 | 10/1992 |
| JP | A-09-135580 | 5/1997 |
| JP | A-10-225014 | 8/1998 |
| JP | A-2002-165488 | 6/2002 |
| JP | A-2004-038246 | 2/2004 |
| JP | A-2004-120853 | 4/2004 |

* cited by examiner

US 7,688,604 B2

AC VOLTAGE OUTPUT APPARATUS AND HYBRID VEHICLE INCLUDING THE SAME

TECHNICAL FIELD

The present invention relates to an AC (Alternating Current) voltage output apparatus and a hybrid vehicle including the same, and more particularly to an AC voltage output apparatus capable of generating a commercial AC voltage and outputting the same to a load device, as well as to a hybrid vehicle including the same.

BACKGROUND ART

In order to effectively utilize a hybrid vehicle, an attempt to utilize the hybrid vehicle as a power supply facility has conventionally been made. As such a hybrid vehicle, a hybrid vehicle including a dedicated inverter for converting a DC (Direct Current) voltage generated in the hybrid vehicle to AC 100V has been known.

Meanwhile, Japanese Patent Laying-Open No. 04-295202 discloses an electric motor drive and power processing apparatus capable of generating an AC voltage and supplying the voltage to an external device without including a dedicated inverter. The electric motor drive and power processing apparatus includes a secondary battery, inverters IA, IB, three-phase AC motors MA, MB, and a control unit. Three-phase AC motors MA, MB include Y-connected three-phase windings CA, CB respectively, and an input/output port is connected to a neutral point NA of three-phase winding CA and a neutral point NB of three-phase winding CB through an EMI filter.

Inverters IA, IB are provided corresponding to three-phase AC motors MA, MB respectively, and connected to three-phase windings CA, CB respectively. Inverters IA, IB are connected to the secondary battery in parallel.

In the electric motor drive and power processing apparatus, inverters IA, IB can generate AC power of which sine wave is regulated across neutral points NA, NB and can output the generated AC power to the external device connected to the input/output port.

Generally, while the three-phase AC motor including a Y-connected three-phase coil as a stator coil is revolving, a harmonic of order of multiple of 3, of counter-electromotive force generated in the coil of each phase appears in a potential of the neutral point of the three-phase coil. Briefly speaking, assuming that the number of revolutions of the three-phase AC motor is denoted as ω, induced voltage $e_u, e_v, e_w$ of the coil of each phase is expressed in the following equation.

$$e_U = e_1 \sin\omega t + e_3 \sin 3\omega t + e_5 \sin 5\omega t + \ldots \quad (1)$$

$$e_V = \quad (2)$$
$$e_1 \sin\left(\omega t - \frac{2}{3}\pi\right) + e_3 \sin 3\left(\omega t - \frac{2}{3}\pi\right) + e_5 \sin 5\left(\omega t - \frac{2}{3}\pi\right) + \ldots$$

$$e_W = \quad (3)$$
$$e_1 \sin\left(\omega t - \frac{4}{3}\pi\right) + e_3 \sin 3\left(\omega t - \frac{4}{3}\pi\right) + e_5 \sin 5\left(\omega t - \frac{4}{3}\pi\right) + \ldots$$

Here, $e_1, e_3, e_5 \ldots$ are constants specific to each motor. Based on Equations (1) to (3), a potential of neutral point $e_N$ is expressed in the following equation.

$$e_N = \frac{1}{3}(e_U + e_V + e_W) \quad (4)$$
$$= e_3 \sin 3\omega t + e_6 \sin 6\omega t + e_9 \sin 9\omega t + \ldots$$

Here, $e_3, e_6, e_9 \ldots$ are constants specific to each motor. As shown in Equation (4), potential of neutral point $e_N$ includes the harmonic of order of multiple of 3, of counter-electromotive force. Therefore, if three-phase AC motors MA, MB revolve while the AC power is generated across neutral points NA, NB in the electric motor drive and power processing apparatus disclosed in Japanese Patent Laying-Open No. 04-295202, the harmonic as above is contained as disturbance in the generated AC power. Japanese Patent Laying-Open No. 04-295202, however, does not address such a problem in particular.

DISCLOSURE OF THE INVENTION

From the foregoing, the present invention was made to solve the above-described problems, and an object of the present invention is to provide an AC voltage output apparatus capable of suppressing a harmonic of counter-electromotive force generated along with revolution of a motor and outputting a commercial AC voltage of which distortion is suppressed to a load device.

According to the present invention, an AC voltage output apparatus includes: a first polyphase AC motor including a star-connected first polyphase winding as a stator winding; a second polyphase AC motor including a star-connected second polyphase winding as a stator winding; first and second inverters connected to the first and second polyphase windings respectively; and a control device controlling the first and second inverters such that an AC voltage having a prescribed frequency is generated across a neutral point of the first polyphase winding and a neutral point of the second polyphase winding when a rotor of the second polyphase AC motor is stopped. The control device includes a harmonic generation unit generating a harmonic voltage instruction having a phase opposite to a harmonic of counter-electromotive force generated at the neutral point of the first polyphase winding, based on the number of revolutions of the first polyphase AC motor when a rotor of the first polyphase AC motor revolves, and a signal generation unit generating a control signal for controlling the first inverter based on a voltage instruction obtained by superposing the harmonic voltage instruction onto a voltage instruction of each phase of the first polyphase AC motor and outputting the generated control signal to the first inverter.

In the AC voltage output apparatus according to the present invention, the first and second inverters generate an AC voltage having a prescribed frequency (for example, a commercial power supply frequency) across the neutral point of the first polyphase winding and the neutral point of the second polyphase winding when the rotor of the second polyphase AC motor is stopped. Here, the harmonic generation unit generates the harmonic voltage instruction having the phase opposite to the harmonic of counter-electromotive force generated at the neutral point of the first polyphase winding, based on the number of revolutions of the first polyphase AC motor when the rotor of the first polyphase AC motor revolves, while the signal generation unit generates the control signal for controlling the first inverter based on the voltage instruction obtained by superposing the harmonic voltage instruction from the harmonic generation unit onto the voltage instruction of each phase of the first polyphase AC motor. Therefore, the harmonic of the counter-electromotive force generated at the neutral point of the first winding when the rotor of the first polyphase AC motor revolves is suppressed.

Therefore, according to the AC voltage output apparatus of the present invention, even when the first polyphase AC motor is revolving, the AC voltage of which distortion is suppressed can be supplied to the load device. Consequently, malfunction of an external device receiving supply of the AC voltage can be prevented. In addition, according to the AC voltage output apparatus, the AC voltage is generated across the neutral point of the first polyphase winding and the neutral point of the second polyphase winding, and output to the load device. Therefore, it is not necessary to separately provide a dedicated inverter for generating the AC voltage. Moreover, as the harmonic generation unit can be configured with software, the AC voltage of which distortion is suppressed can be supplied to the load device without additional special hardware.

Preferably, the first polyphase AC motor includes a permanent magnet type three-phase AC synchronous motor. The harmonic generation unit generates the harmonic voltage instruction having a phase opposite to a 3nth-order harmonic component (n is a natural number) of the counter-electromotive force.

Generally, the counter-electromotive force of the permanent magnet type three-phase AC synchronous motor has a trapezoidal waveform, and the potential of the neutral point of the permanent magnet type three-phase AC synchronous motor includes in particular a large amount of harmonic of order of multiple of 3 of the counter-electromotive force. In the AC voltage output apparatus, as the harmonic generation unit generates the harmonic voltage instruction having the phase opposite to the 3nth-order harmonic component of the counter-electromotive force, the harmonic is effectively suppressed. Therefore, according to the AC voltage output apparatus, even with the use of the permanent magnet type three-phase AC synchronous motor in which the harmonic noticeably appears in the potential of the neutral point, the AC voltage of which distortion is suppressed can be generated and supplied to the load device.

Preferably, the harmonic generation unit generates the harmonic voltage instruction having a phase opposite to a third-order harmonic component of the counter-electromotive force.

Generally, in many cases, a low-order component is dominant in the harmonic. Accordingly, in the AC voltage output apparatus, the harmonic generation unit generates the harmonic voltage instruction having the phase opposite to the third-order harmonic component which is the lowest order. Therefore, according to the AC voltage output apparatus, distortion of the AC voltage can effectively be suppressed with low operation load.

Preferably, the AC voltage output apparatus further includes an output circuit configured to output the AC voltage generated across the neutral point of the first polyphase winding and the neutral point of the second polyphase winding to a load device receiving supply of the AC voltage. The harmonic generation unit generates the harmonic voltage instruction having a phase opposite to a harmonic component having a frequency in the vicinity of a resonance frequency of the output circuit.

Preferably, the output circuit includes a first output line having one end connected to the neutral point of the first polyphase winding and the other end connected to an output terminal to which the load device is connected, a second output line having one end connected to the neutral point of the second polyphase winding and the other end connected to the output terminal, and a capacitor connected between the first output line and the second output line. A resonance frequency of the output circuit is determined specific to an LC circuit formed by the first and second polyphase windings and the capacitor.

In the AC voltage output apparatus, the capacitor is connected between the first output line and the second output line. Therefore, influence of ripple to the load device receiving supply of the AC voltage through the first and second output lines is suppressed. When the capacitor is provided, however, the LC circuit (resonant circuit) is formed in the output circuit. Here, as the harmonic generation unit generates the harmonic voltage instruction having the phase opposite to the harmonic component having the frequency in the vicinity of the resonance frequency of the output circuit, resonance of the output circuit is suppressed. Therefore, according to the AC voltage output apparatus, the AC voltage of which distortion due to resonance of the output circuit is suppressed can be supplied to the load device.

Preferably, the AC voltage output apparatus further includes a load determination unit determining whether load of the load device is smaller than a reference value set in advance. The harmonic generation unit generates the harmonic voltage instruction when the load determination unit determines that the load is smaller than the reference value.

Generally, resonance of the output circuit is noticeable when the load of the load device is light. Accordingly, in the AC voltage output apparatus, the load determination unit determines whether load of the load device is light or not, and the harmonic generation unit generates the harmonic voltage instruction only when the load is light. Therefore, according to the AC voltage output apparatus, distortion of the AC voltage can efficiently be suppressed.

Preferably, the first polyphase AC motor includes a permanent magnet type three-phase AC synchronous motor. The harmonic generation unit generates the harmonic voltage instruction having a phase opposite to a ninth-order harmonic component having a frequency in the vicinity of the resonance frequency.

As described above, generally, the potential of the neutral point of the permanent magnet type three-phase AC synchronous motor includes in particular a large amount of harmonic of order of multiple of 3 of the counter-electromotive force. In the AC voltage output apparatus, the frequency of the ninth-order harmonic component is located in the vicinity of the resonance frequency of the output circuit. Here, as the harmonic generation unit generates the harmonic voltage instruction having the phase opposite to the ninth-order harmonic component, the harmonic is effectively suppressed. Therefore, according to the AC voltage output apparatus, even with the use of the permanent magnet type three-phase AC synchronous motor in which the harmonic noticeably appears in the potential of the neutral point, the AC voltage of which distortion due to resonance of the output circuit is suppressed can be supplied to the load device.

In addition, according to the present invention, an AC voltage output apparatus includes: a first polyphase AC motor including a star-connected first polyphase winding as a stator winding; a second polyphase AC motor including a star-connected second polyphase winding as a stator winding; first and second inverters connected to the first and second polyphase windings respectively; and a control device controlling the first and second inverters such that an AC voltage having a prescribed frequency is generated across a neutral point of the first polyphase winding and a neutral point of the second polyphase winding. The control device includes: a first harmonic generation unit generating a first harmonic voltage instruction having a phase opposite to a harmonic of counter-electromotive force generated at the neutral point of the first polyphase winding, based on the number of revolutions of the first polyphase AC motor when a rotor of the first polyphase AC motor revolves; a first signal generation unit generating a control signal for controlling the first inverter based on a voltage instruction obtained by superposing the first harmonic voltage instruction onto a voltage instruction of each phase of the first polyphase AC motor and outputting the generated control signal to the first inverter; a second harmonic generation unit generating a second harmonic voltage instruction having a phase opposite to a harmonic of counter-electromotive force generated at the neutral point of the second polyphase winding, based on the number of revolutions of the second polyphase AC motor when a rotor of the second polyphase AC motor revolves; and a second signal generation unit generating a control signal for controlling the second inverter based on a voltage instruction obtained by superposing the second harmonic voltage instruction onto a voltage instruction of each phase of the second polyphase AC motor and outputting the generated control signal to the second inverter.

In the AC voltage output apparatus according to the present invention, the first and second inverters generate an AC voltage having a prescribed frequency (for example, a commercial power supply frequency) across the neutral point of the first polyphase winding and the neutral point of the second polyphase winding. Here, the AC voltage output apparatus includes not only the first harmonic generation unit generating the harmonic voltage instruction having the phase opposite to the harmonic of counter-electromotive force generated at the neutral point of the first polyphase winding, but also the second harmonic generation unit generating the harmonic voltage instruction having the phase opposite to the harmonic of counter-electromotive force generated at the neutral point of the second polyphase winding. Therefore, even if both of the first and second polyphase AC motors are revolving, the harmonic of each counter-electromotive force generated at the neutral point of each of the first and second windings is suppressed.

Therefore, according to the AC voltage output apparatus of the present invention, even if both of the first and second polyphase AC motors are revolving, the AC voltage of which distortion is suppressed can be supplied to the load device.

Moreover, according to the present invention, a hybrid vehicle includes any AC voltage output apparatus described above, an internal combustion engine coupled to the first polyphase AC motor and providing rotational torque to the first polyphase AC motor, and a drive wheel coupled to the second polyphase AC motor and receiving rotational torque from the second polyphase AC motor.

The hybrid vehicle according to the present invention includes any AC voltage output apparatus described above. Therefore, according to the present invention, the hybrid vehicle can be utilized as the power supply facility, and the AC voltage of which distortion is suppressed can be supplied from the hybrid vehicle to the load device. In addition, as it is not necessary to provide a dedicated inverter for generating the AC voltage, smaller size, lower cost or lighter weight (higher fuel efficiency) demanded in particular in the hybrid vehicle is not impaired.

As described above, according to the present invention, the harmonic of counter-electromotive force generated along with revolution of the motor can be suppressed and the commercial AC voltage of which distortion is suppressed can be output to the load device. In addition, the commercial AC voltage is generated across the neutral point of the first polyphase winding and the neutral point of the second polyphase winding and output to the load device. Therefore, it is not necessary to provide a dedicated inverter for generating the commercial AC voltage.

BEST MODES FOR CARRYING OUT THE INVENTION

Figure 1:
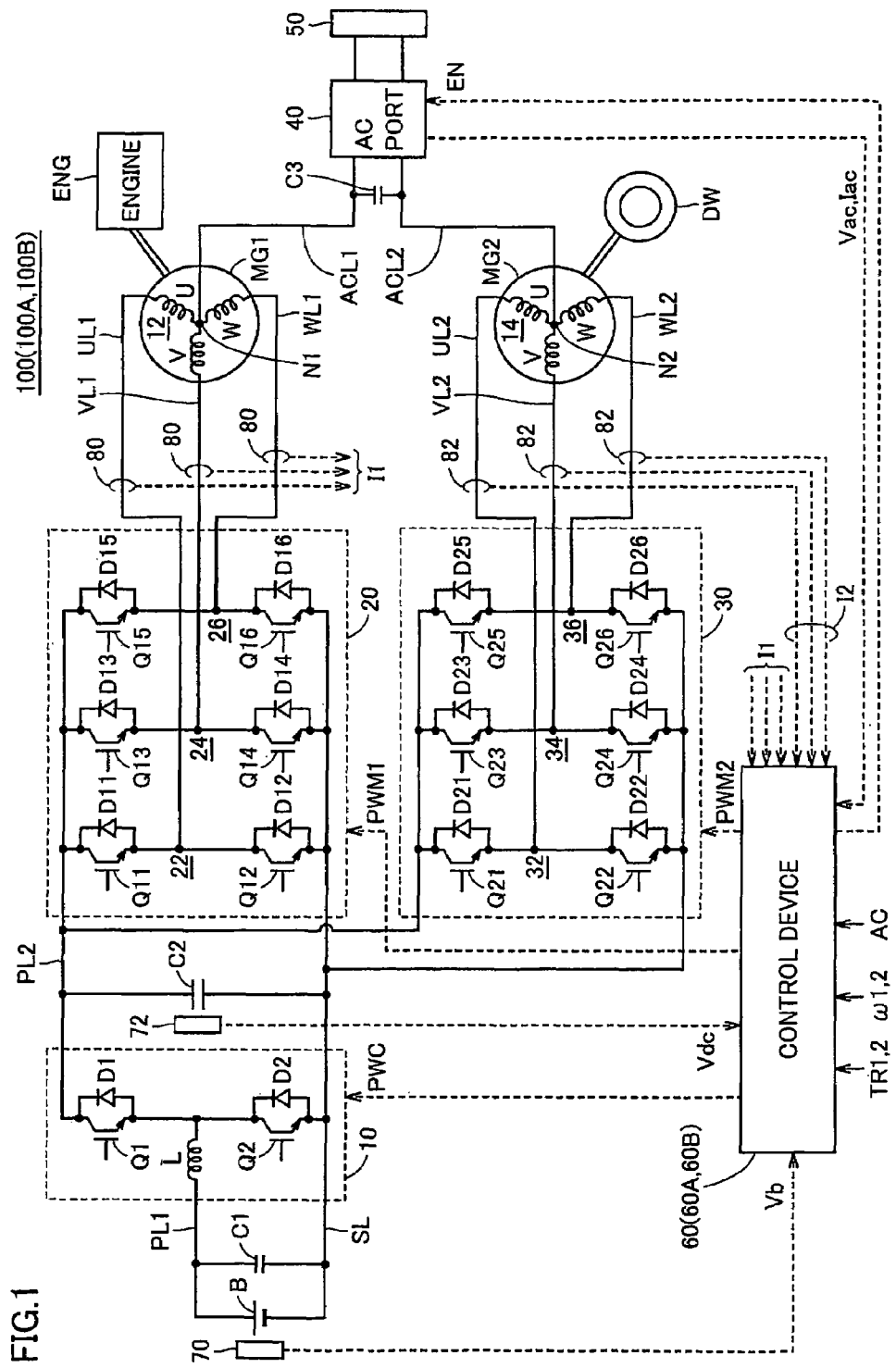
FIG. 1 is a block diagram showing an overall AC voltage output apparatus according to a first embodiment of the present invention.

An embodiment of the present invention will be described hereinafter in detail with reference to the drawings. As the same or corresponding elements have the same reference characters allotted, detailed description thereof will not be repeated.

First Embodiment

FIG. 1 is a block diagram showing an overall AC voltage output apparatus 100 according to a first embodiment of the present invention. Referring to FIG. 1, AC voltage output apparatus 100 includes a battery B, a boost converter 10, inverters 20, 30, motor-generators MG1, MG2, AC output lines ACL1, ACL2, an AC port 40, a connector 50, a control device 60, capacitors C1 to C3, power supply lines PL1, PL2, a ground line SL, U-phase lines UL1, UL2, V-phase lines VL1, VL2, W-phase lines WL1, WL2, voltage sensors 70, 72, and current sensors 80, 82.

AC voltage output apparatus 100 is mounted on a vehicle such as a hybrid vehicle. Motor-generator MG1 is incorporated in the hybrid vehicle as a component connected to an engine ENG and operating as a motor capable of starting engine ENG and as a generator driven by engine ENG. Motor-generator MG2 is incorporated in the hybrid vehicle as a motor connected to a drive wheel DW and driving drive wheel DW.

Battery B has a positive electrode connected to power supply line PL1 and a negative electrode connected to ground line SL. Capacitor C1 is connected between power supply line PL1 and ground line SL.

Boost converter 10 includes a reactor L, power transistors Q1, Q2, and diodes D1, D2. Power transistors Q1, Q2 are connected in series between power supply line PL2 and ground line SL. Diodes D1, D2 are connected between collectors and emitters of power transistors Q1, Q2 respectively, so that a current flows from the emitter side to the collector side. Reactor L has one end connected to a connection point of power transistors Q1, Q2 and the other end connected to power supply line PL1.

Capacitor C2 is connected between power supply line PL2 and ground line SL. Inverter 20 includes a U-phase arm 22, a V-phase arm 24 and a W-phase arm 26. U-phase arm 22, V-phase arm 24 and W-phase arm 26 are connected in parallel between power supply line PL2 and ground line SL. U-phase arm 22 includes power transistors Q11, Q12 connected in series, V-phase arm 24 includes power transistors Q13, Q14 connected in series, and W-phase arm 26 includes power transistors Q15, Q16 connected in series. Diodes D11 to D16 that allow current flow from the emitter side to the collector side are connected between collectors and emitters of power transistors Q11 to Q16 respectively.

Inverter 30 includes a U-phase arm 32, a V-phase arm 34 and a W-phase arm 36. U-phase arm 32, V-phase arm 34 and W-phase arm 36 are connected in parallel between power supply line PL2 and ground line SL. U-phase arm 32 includes power transistors Q21, Q22 connected in series, V-phase arm 34 includes power transistors Q23, Q24 connected in series, and W-phase arm 36 includes power transistors Q25, Q26 connected in series. Diodes D21 to D26 that allow current flow from the emitter side to the collector side are connected between collectors and emitters of power transistors Q21 to Q26 respectively.

Motor-generators MG1, MG2 include three-phase coils 12, 14 as stator coils respectively. One ends of U-phase, V-phase and W-phase coils forming three-phase coil 12 are connected to each other to form a neutral point N1, and the other ends of U-phase, V-phase and W-phase coils are connected to connection points of the power transistors in U-phase, V-phase and W-phase arms of inverter 20 respectively. In addition, one ends of U-phase, V-phase and W-phase coils forming three-phase coil 14 are connected to each other to form a neutral point N2, and the other ends of U-phase, V-phase and W-phase coils are connected to connection points of the power transistors in U-phase, V-phase and W-phase arms of inverter 30 respectively.

AC output line ACL1 has one end connected to neutral point N1 and the other end connected to AC port 40. AC output line ACL2 has one end connected to neutral point N2 and the other end connected to AC port 40. Capacitor C3 is connected between AC output line ACL1 and AC output line ACL2. AC port 40 is arranged between AC output lines ACL1, ACL2 and connector 50.

Battery B is a DC power supply, and implemented by a secondary battery such as a nickel-metal hydride battery or a lithium ion battery. Battery B generates a DC voltage, and outputs the generated DC voltage to boost converter 10. Battery B is charged with the DC voltage output from boost converter 10.

Voltage sensor 70 detects a battery voltage Vb output from battery B and outputs detected battery voltage Vb to control device 60. Capacitor C1 smoothes voltage fluctuation between power supply line PL1 and ground line SL.

Boost converter 10 boosts the DC voltage supplied from battery B by means of reactor L based on a control signal PWC from control device 60, and outputs the resultant voltage to power supply line PL2. More specifically, based on signal PWC from control device 60, boost converter 10 accumulates a current that flows in accordance with a switching operation of power transistor Q2 in reactor L as magnetic energy, so as to boost the DC voltage from battery B, and outputs the boosted voltage to power supply line PL2 through diode D1 in synchronization with timing of turn-off of power transistor Q2. In addition, based on signal PWC from control device 60, boost converter 10 down-converts the DC voltage supplied through power supply line PL2, and charges battery B.

Capacitor C2 smoothes voltage fluctuation between power supply line PL2 and ground line SL. Voltage sensor 72 detects a voltage between terminals of capacitor C2, that is, a voltage of power supply line PL2 with respect to ground line SL (hereinafter, this voltage is also referred to as a "system voltage"), and outputs detected system voltage Vdc to control device 60.

Inverter 20 converts the DC voltage received from power supply line PL2 to a three-phase AC voltage based on a signal PWM1 from control device 60, and outputs the resultant three-phase AC voltage to motor-generator MG1. In this manner, motor-generator MG1 is driven to generate torque designated by a torque control value TR1. In addition, inverter 20 converts the three-phase AC voltage generated by motor-generator MG1 in response to power from engine ENG to the DC voltage based on signal PWM1 from control device 60, and outputs the resultant DC voltage to power supply line PL2.

Inverter 30 converts the DC voltage received from power supply line PL2 to a three-phase AC voltage based on a signal PWM2 from control device 60, and outputs the resultant three-phase AC voltage to motor-generator MG2. In this manner, motor-generator MG2 is driven to generate torque designated by a torque control value TR2. In addition, during regenerative braking of the vehicle, inverter 30 converts to the DC voltage, the three-phase AC voltage generated by motor-generator MG2 by receiving rotation force from drive wheel DW based on signal PWM2 from control device 60, and outputs the resultant DC voltage to power supply line PL2. It is noted that the regenerative braking herein encompasses braking accompanied by regenerative power generation when a driver who drives the vehicle manipulates a foot brake, or deceleration (or stop of acceleration) of the vehicle while regeneratively generating power by not pressing down an accelerator pedal during running, although not manipulating the foot brake.

Here, if an output of the commercial AC voltage to a load device (not shown, here and hereinafter) connected to connector 50 is requested, inverters 20, 30 generate the commercial AC voltage across neutral points N1, N2. Specifically, inverter 20 controls a potential of neutral point N1 based on control signal PWM1 from control device 60, so as to generate the commercial AC voltage across neutral points N1, N2, while inverter 30 controls a potential of neutral point N2 based on control signal PWM2 from control device 60, so as to generate the commercial AC voltage across neutral points N1, N2.

Each of motor-generators MG1, MG2 is a three-phase AC motor, and implemented, for example, by an IPM (Interior Permanent Magnet) type three-phase AC synchronous motor. Motor-generator MG1 is connected to engine ENG, generates the three-phase AC voltage using power from engine ENG, and outputs the generated three-phase AC voltage to inverter 20. In addition, motor-generator MG1 generates drive force by using the three-phase AC voltage from inverter 20, and starts engine ENG. Motor-generator MG2 is connected to drive wheel DW of the vehicle, and generates drive torque of the vehicle by using the three-phase AC voltage from inverter 30. In addition, motor-generator MG2 generates the three-phase AC voltage and outputs the same to inverter 30 during regenerative braking of the vehicle.

Capacitor C3 eliminates influence of ripple to the load device connected to connector 50. AC port 40 includes a relay for connection/disconnection of AC output lines ACL1, ACL2 and connector 50 to/from each other, as well as a voltage sensor and a current sensor for detecting an AC voltage Vac and an AC current Iac generated in AC output lines ACL1, ACL2 respectively (none of which is shown). AC port 40 turns on the relay upon receiving an output permission instruction EN from control device 60, and electrically connects connector 50 to AC output lines ACL1, ACL2. AC port 40 detects AC voltage Vac and AC current Iac in AC output lines ACL1, ACL2, and outputs detected AC voltage Vac and AC current Iac to control device 60.

Connector 50 serves as an output terminal for output of the commercial AC voltage generated across neutral points N1, N2 to an external load device, and it is connected to a power supply outlet of each electric appliance or an emergency power supply outlet of a household.

Current sensor 80 detects a motor current I1 that flows in motor-generator MG1 and outputs detected motor current I1 to control device 60. Current sensor 82 detects a motor current I2 that flows in motor-generator MG2 and outputs detected motor current I2 to control device 60.

Control device 60 generates signal PWC for driving boost converter 10 based on torque control values TR1, TR2 and motor revolution numbers ω1, ω2 of motor-generators MG1, MG2 respectively output from an externally provided ECU (not shown, here and hereinafter), battery voltage Vb from voltage sensor 70 and system voltage Vdc from voltage sensor 72, and outputs generated signal PWC to boost converter 10.

In addition, control device 60 generates signal PWM1 for driving motor-generator MG1 based on system voltage Vdc, torque control value TR1 of motor-generator MG1 and motor current I1 from current sensor 80, and outputs generated signal PWM1 to inverter 20. Moreover, control device 60 generates signal PWM2 for driving motor-generator MG2 based on system voltage Vdc, torque control value TR2 of motor-generator MG2 and motor current I2 from current sensor 82, and outputs generated signal PWM2 to inverter 30.

Here, upon receiving from the ECU a signal AC at H (logic high) level requesting an output of the commercial AC voltage to the load device connected to connector 50 when the vehicle is stopped, control device 60 generates signal PWM1 while controlling the sum of duty of power transistors Q11, Q13, Q15 in the upper arm of inverter 20 and power transistors Q12, Q14, Q16 in the lower arm thereof, and generates signal PWM2 while controlling the sum of duty of power transistors Q21, Q23, Q25 in the upper arm of inverter 30 and power transistors Q22, Q24, Q26 in the lower arm thereof, so that the commercial AC voltage is generated across neutral points N1, N2. Details of control will be described later.

Further, control device 60 carries out control in order to suppress the harmonic component of the counter-electromotive force generated at neutral point N1 of three-phase coil 12 of motor-generator MG1 while motor-generator MG1 is revolving (generates power) in generating the commercial AC voltage across neutral points N1, N2. Control for suppressing the harmonic will also be described later in detail.

Figure 2:
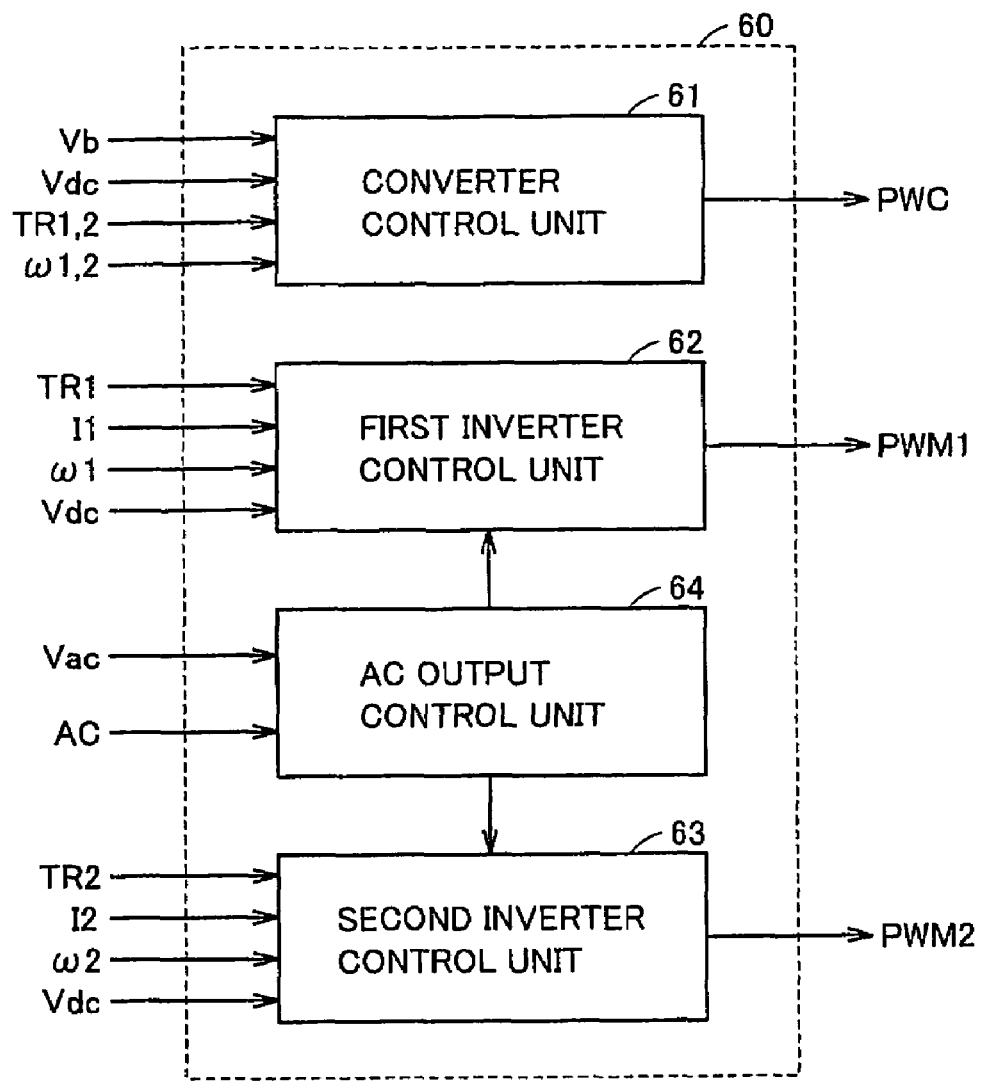
FIG. 2 is a functional block diagram of a control device shown in FIG. 1.

FIG. 2 is a functional block diagram of control device 60 shown in FIG. 1. Referring to FIG. 2, control device 60 includes a converter control unit 61, first and second inverter control units 62, 63, and an AC output control unit 64. Converter control unit 61 generates signal PWC for turning on/off power transistors Q1, Q2 of boost converter 10, based on battery voltage Vb, system voltage Vdc, torque control values TR1, TR2, and motor revolution numbers ω, ω2, and outputs generated signal PWC to boost converter 10.

First inverter control unit 62 generates signal PWM1 for turning on/off power transistors Q11 to Q16 of inverter 20 based on torque control value TR1, motor current I1 and motor revolution number ω1 of motor-generator MG1 as well as on system voltage Vdc, and outputs generated signal PWM1 to inverter 20.

Here, while first inverter control unit 62 receives from AC output control unit 64 the AC voltage instruction for generating the commercial AC voltage across neutral points N1, N2, first inverter control unit 62 generates signal PWM1 while varying the sum of duty of the upper arm and the lower arm of inverter 20 based on the received AC voltage instruction.

Second inverter control unit 63 generates signal PWM2 for turning on/off power transistors Q21 to Q26 of inverter 30 based on torque control value TR2, motor current I2 and motor revolution number ω2 of motor-generator MG2 as well as on system voltage Vdc, and outputs generated signal PWM2 to inverter 30.

Here, while second inverter control unit 63 receives from AC output control unit 64 the AC voltage instruction for generating the commercial AC voltage across neutral points N1, N2, second inverter control unit 63 generates signal PWM2 while varying the sum of duty of the upper arm and the lower arm of inverter 30 based on the received AC voltage instruction.

AC output control unit 64 determines whether or not the commercial AC voltage is to be generated across neutral points N1, N2 based on signal AC. Here, signal AC is, for example, a signal of which logic level is varied in response to an operation of an AC output switch, and signal AC at H level is a signal requesting output of the commercial AC voltage to the load device connected to connector 50 when the vehicle is stopped.

AC output control unit 64 generates the AC voltage instruction for generating the commercial AC voltage across neutral points N1, N2 based on AC voltage Vac detected at AC port 40 while receiving signal AC at H level, and outputs the generated AC voltage instruction to first and second inverter control units 62, 63.

Figure 3:
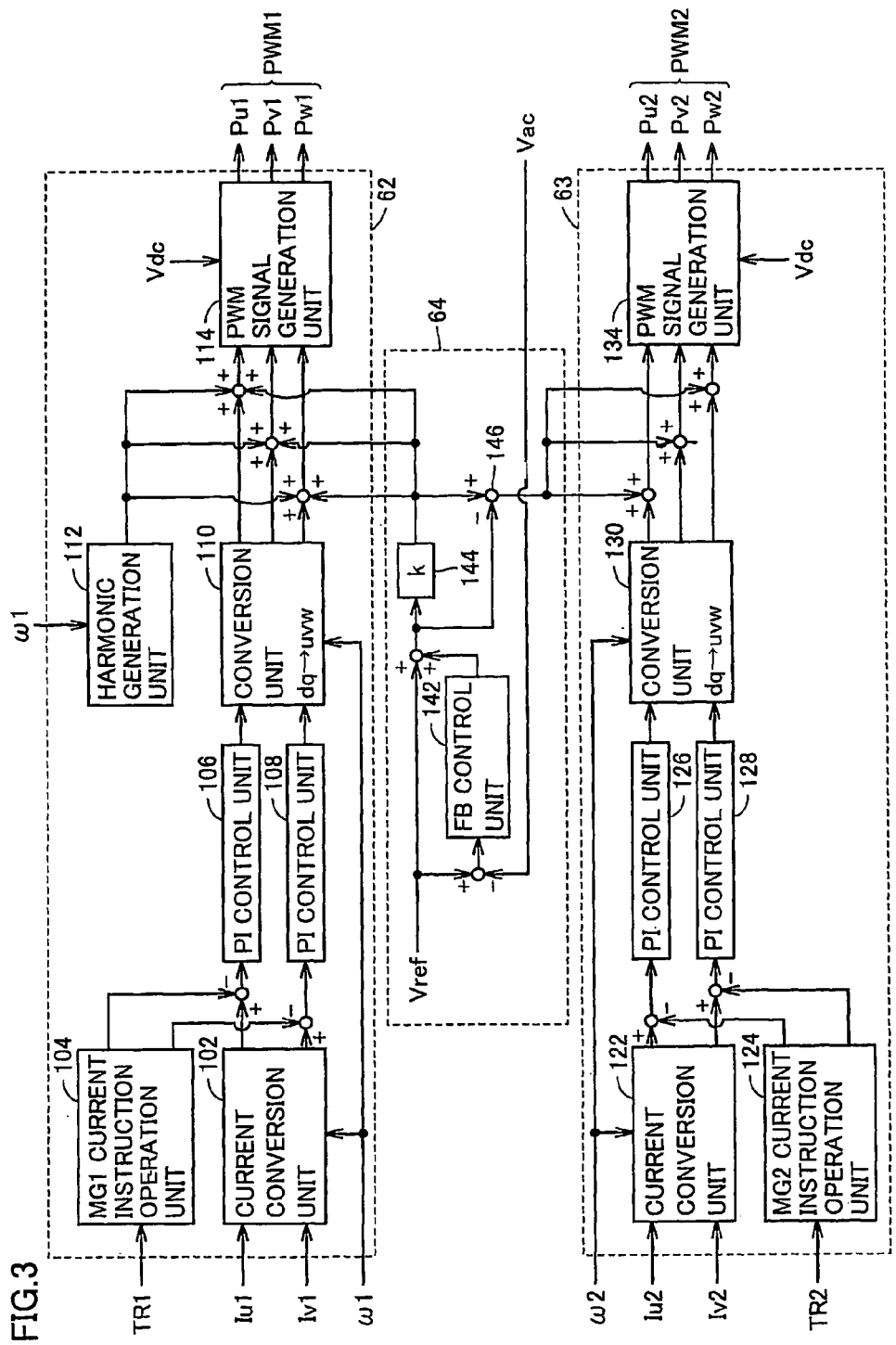
FIG. 3 is a functional block diagram showing in detail first and second inverter control units and an AC output control unit shown in FIG. 2.

FIG. 3 is a functional block diagram showing in detail first and second inverter control units 62, 63 and AC output control unit 64 shown in FIG. 2. Referring to FIG. 3, first inverter control unit 62 includes a current conversion unit 102, an MG1 current instruction operation unit 104, PI control units 106, 108, a conversion unit 110, a harmonic generation unit 112, and a PWM signal generation unit 114.

Current conversion unit 102 converts a U-phase current Iu1 and a V-phase current Iv1 detected by current sensor 80 to a d-axis current Id1 and a q-axis current Iq1, by using motor revolution number ω1 of motor-generator MG1. MG1 current instruction operation unit 104 calculates current instructions Id1r, Iq1r for motor-generator MG1 in d, q axes, based on torque control value TR1 of motor-generator MG1.

PI control unit 106 receives deviation between d-axis current Id1 from current conversion unit 102 and current instruction Id1r from MG1 current instruction operation unit 104, performs proportional-plus-integral operation using the deviation as an input, and outputs the result of operation to conversion unit 110. PI control unit 108 receives deviation between q-axis current Iq1 from current conversion unit 102 and current instruction Iq1r from MG1 current instruction operation unit 104, performs proportional-plus-integral operation using the deviation as an input, and outputs the result of operation to conversion unit 110.

Conversion unit 110 converts the voltage instructions on the d, q axes received from PI control units 106, 108 respectively to U-phase, V-phase and W-phase voltage instructions, by using motor revolution number ω1.

Harmonic generation unit 112 receives motor revolution number ω, and while ω1≠0, that is, while motor-generator MG1 is revolving, harmonic generation unit 112 generates a harmonic voltage instruction $e_{GN}$ based on motor revolution number ω1, as shown in the following equation.

$$e_{GN} = -e_{G3} \sin 3\omega_1 t - e_{G6} \sin 6\omega_1 t - e_{G9} \sin 9\omega_1 t - \quad (5)$$

Here, $e_{G3}, e_{G6}, e_{G9} \ldots$ are constants determined specific to motor-generator MG1. As described above, in motor-generator MG1 implemented by the three-phase AC motor, when motor-generator MG1 revolves, the harmonic component of order of multiple of 3 of counter-electromotive force is generated at neutral point N1 as shown in Equation (4). In particular, if motor-generator MG1 is implemented by the IPM-type three-phase AC synchronous motor, the counter-electromotive force of the IPM-type three-phase AC synchronous motor has the trapezoidal waveform and contains a large amount of harmonic component of 3nth order (n is a natural number). Accordingly, the harmonic generated at neutral point N1 is noticeable. In addition, AC voltage output apparatus 100 generates the commercial AC voltage across neutral points N1, N2 and supplies the same to the external load device. Therefore, if the potential of neutral point N1 contains the harmonic component of the counter-electromotive force, the generated commercial AC voltage is distorted, which adversely affects the load device.

Accordingly, in the first embodiment, the harmonic that may be generated at neutral point N1 is suppressed in such a manner that harmonic generation unit 112 generates harmonic voltage instruction $e_{GN}$ having a phase opposite to the 3nth-order harmonic using Equation (5) above, and generated harmonic voltage instruction $e_{GN}$ is superposed on the U-phase, V-phase and W-phase voltage instructions from conversion unit 110.

It is noted that harmonic voltage instruction $e_{GN}$ may contain solely the third-order harmonic component as shown in the equation below, in view of the fact that the lower-order harmonic component is generally dominant, relative to the higher-order harmonic component.

$$e_{GN} = -e_{G3} \sin 3\omega_1 t \quad (6)$$

PWM signal generation unit 114 generates PWM (Pulse Width Modulation) signals Pu1, Pv1, Pw1 corresponding to inverter 20, based on system voltage Vdc and the voltage instruction obtained by superposing the AC voltage instruction from AC output control unit 64 and the harmonic voltage instruction from harmonic generation unit 112 on the U-phase, V-phase and W-phase voltage instructions from conversion unit 110, and outputs generated PWM signals Pu1, Pv1, Pw1 to inverter 20 as signal PWM1.

It is noted that superposing the AC voltage instruction from AC output control unit 64 equally on the U-phase, V-phase and W-phase voltage instructions of motor-generator MG1 from conversion unit 110 corresponds to varying the sum of duty of the upper arm and the lower arm of inverter 20 based on the AC voltage instruction.

Second inverter control unit 63 includes a current conversion unit 122, an MG2 current instruction operation unit 124, PI control units 126, 128, a conversion unit 130, and a PWM signal generation unit 134. Current conversion unit 122 converts a U-phase current Iu2 and a V-phase current Iv2 detected by current sensor 82 to a d-axis current Id2 and a q-axis current Iq2, by using motor revolution number ω2 of motor-generator MG2. MG2 current instruction operation unit 124 calculates current instructions Id2r, Iq2r for motor-generator MG2 in d, q axes, based on torque control value TR2 of motor-generator MG2.

PI control unit 126 receives deviation between d axis current Id2 from current conversion unit 122 and current instruction Id2r from MG2 current instruction operation unit 124, performs proportional-plus-integral operation using the deviation as an input, and outputs the result of operation to conversion unit 130. PI control unit 128 receives deviation between q axis current Iq2 from current conversion unit 122 and current instruction Iq2r from MG2 current instruction operation unit 124, performs proportional-plus-integral operation using the deviation as an input, and outputs the result of operation to conversion unit 130.

Conversion unit 130 converts the voltage instructions on the d, q axes received from PI control units 126, 128 respectively to U-phase, V-phase and W-phase voltage instructions, by using motor revolution number ω2.

PWM signal generation unit 134 generates PWM signals Pu2, Pv2, Pw2 corresponding to inverter 30, based on the voltage instruction obtained by superposing the AC voltage instruction from AC output control unit 64 on voltage instruction of each phase of motor-generator MG2 from conversion unit 130, and outputs generated PWM signals Pu2, Pv2, Pw2 to inverter 30 as signal PWM2.

It is noted that superposing the AC voltage instruction from AC output control unit 64 equally on the U-phase, V-phase and W-phase voltage instructions of motor-generator MG2 from conversion unit 130 corresponds to varying the sum of duty of the upper arm and the lower arm of inverter 30 based on the AC voltage instruction.

AC output control unit 64 includes an FB control unit 142, a multiplication unit 144 and a subtraction unit 146. FB control unit 142 performs feedback operation based on deviation between an AC voltage reference value Vref and AC voltage Vac (actual value), and outputs the result of operation. Here, AC voltage reference value Vref is a target value of the commercial AC voltage generated across neutral points N1, N2. Various known operation methods (such as proportional-plus-integral control) can be used for the feedback operation.

Multiplication unit 144 multiplies the value obtained by adding the result of operation in FB control unit 142 to AC voltage reference value Vref by k (k is a constant not smaller than 0 and not greater than 1), and outputs the result of operation to first inverter control unit 62 as the AC voltage instruction to first inverter control unit 62. Subtraction unit 146 subtracts the input value for multiplication unit 144 from the output value of multiplication unit 144, and outputs the result of operation to second inverter control unit 63 as the AC voltage instruction to second inverter control unit 63.

In other words, the AC voltage instruction obtained by adding the result of operation in FB control unit 142 to AC voltage reference value Vref is multiplied by k, of which result is output to first inverter control unit 62, and it is multiplied by −(1−k), of which result is output to second inverter control unit 63. In other words, constant k represents a workload sharing ratio between motor-generators MG1, MG2 when the commercial AC voltage Vac is generated across neutral points N1, N2. If constant k exceeds 0.5, burden on motor-generator MG1 is greater. On the other hand, if constant k is smaller than 0.5, burden on motor-generator MG2 is greater.

Though not particularly shown, AC output control unit 64 outputs the generated AC voltage instruction to first and second inverter control units 62, 63 while it is receiving signal AC at H level, and sets the AC voltage instruction output to first and second inverter control units 62, 63 to 0 while it is receiving signal AC at L (logic low) level.

Figure 4:
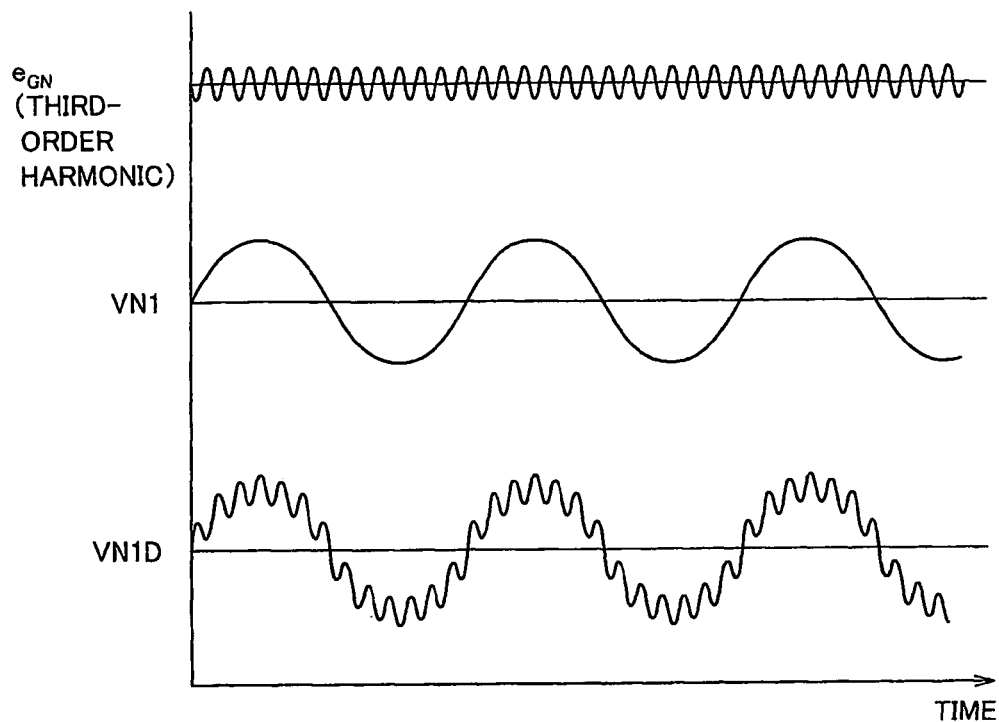
FIG. 4 is a waveform diagram of a potential of a neutral point of a motor-generator and a harmonic voltage instruction generated by a harmonic generation unit shown in FIG. 3.

FIG. 4 is a waveform diagram of a potential VN1 at neutral point N1 of motor-generator MG1 and the harmonic voltage instruction generated by harmonic generation unit 112 shown in FIG. 3. FIG. 4 shows an example in which harmonic generation unit 112 generates harmonic voltage instruction $e_{GN}$ containing the third-order harmonic based on Equation (6) above. In addition, for the sake of comparison, FIG. 4 shows a potential VN1D at neutral point N1 when voltage compensation by harmonic generation unit 112 is not performed.

Referring to FIG. 4, harmonic generation unit 112 generates harmonic voltage instruction $e_{GN}$ having a phase opposite to the third-order harmonic of the counter-electromotive force generated by motor-generator MG1, based on motor revolution number $\omega 1$ of motor-generator MG1. An amplitude of generated harmonic voltage instruction $e_{GN}$ (that is, constant $e_{G3}$ in Equation (6)) is determined, for example, based on the value of the counter-electromotive force measured in advance in a no-load state of motor-generator MG1.

Then, the voltage instruction obtained by adding the AC voltage instruction from AC output control unit 64 equally to U-phase, V-phase and W-phase voltage instructions from conversion unit 110 and by superposing harmonic voltage instruction $e_{GN}$ from harmonic generation unit 112 on the result of addition equally for each phase is used as the final voltage instruction of inverter 20. If voltage compensation by harmonic generation unit 112 is not performed, the harmonic of the counter-electromotive force appears in the potential of neutral point N1 as shown with potential VN1D. In the first embodiment of the present invention, however, the third-order harmonic of the counter-electromotive force is suppressed by harmonic voltage instruction $e_{GN}$ as shown with potential VN1 and the harmonic hardly appears in potential VN1.

Figure 5:
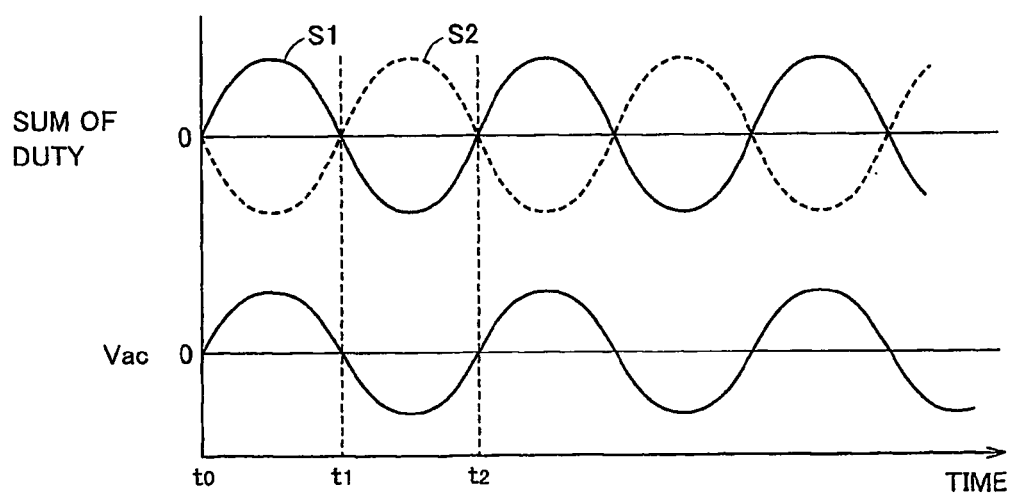
FIG. 5 is a waveform diagram of the sum of duty of the inverters and a generated AC voltage.

FIG. 5 is a waveform diagram of the sum of duty of inverters 20, 30 and generated AC voltage Vac. Referring to FIG. 5, a curve S1 shows variation in the sum of duty in switching control of inverter 20, while a curve S2 shows variation in the sum of duty in switching control of inverter 30. Here, the sum of duty represents the result of subtraction of on-duty of the lower arm from the on-duty of the upper arm in each inverter. FIG. 5 shows that the potential of the neutral point of the corresponding motor-generator is higher than an intermediate potential Vdc/2 of system voltage Vdc when the sum of duty is positive, while the potential of the neutral point is lower than intermediate potential Vdc/2 when the sum of duty is negative.

In AC voltage output apparatus 100, as shown in FIG. 3, the AC voltage instruction output from AC output control unit 64 to first inverter control unit 62 is superposed equally on the U-phase, V-phase and W-phase voltage instructions of motor-generator MG1, so that the sum of duty of inverter 20 is periodically varied at a commercial power supply frequency in accordance with curve S1. In addition, the AC voltage instruction output from AC output control unit 64 to second inverter control unit 63 is superposed equally on the U-phase, V-phase and W-phase voltage instructions of motor-generator MG2, so that the sum of duty of inverter 30 is periodically varied at the commercial power supply frequency in accordance with curve S2.

It is noted that FIG. 5 shows an example in which constant k determining the workload sharing ratio between motor-generators MG1, MG2 is set to 0.5. Therefore, curve S2 has the inverted phase of curve S1. If constant k is greater than 0.5, the amplitude of curve S1 becomes greater and the amplitude of curve S2 becomes smaller. On the other hand, if constant k is smaller than 0.5, the amplitude of curve S1 becomes smaller and the amplitude of curve S2 becomes greater.

From time t0 to t1, the potential of neutral point N1 of motor-generator MG1 is higher than intermediate potential Vdc/2 of system voltage Vdc and the potential of neutral point N2 of motor-generator MG2 is lower than intermediate potential Vdc/2, so that the positive commercial AC voltage is generated across neutral points N1, N2. Here, if the load device is connected to connector 50, excessive current that cannot flow from the upper arms to the lower arms of inverter 20 flows from neutral point N1 to neutral point N2 through AC output line ACL1, the load device and AC output line ACL2, and flows from neutral point N2 to the lower arms of inverter 30.

From time t1 to t2, the potential of neutral point N1 is lower than intermediate potential Vdc/2 and the potential of neutral point N2 is higher than intermediate potential Vdc/2, so that the negative commercial AC voltage is generated across neutral points N1, N2. Here, the current flows from the upper arms of inverter 30 to neutral point N1 through neutral point N2, AC output line ACL2, the load device, and AC output line ACL1, and flows from neutral point N1 to the lower arms of inverter 20.

The commercial AC voltage is thus generated across neutral points N1, N2 of motor-generators MG1, MG2.

As described above, according to the first embodiment, when the vehicle is stopped, the commercial AC voltage can be generated across neutral point N1 of three-phase coil 12 of motor-generator MG1 and neutral point N2 of three-phase coil 14 of motor-generator MG2. Harmonic generation unit 112 generates the harmonic voltage instruction having the phase opposite to the harmonic of the counter-electromotive force generated at neutral point N1 when motor-generator MG1 revolves, and PWM signal generation unit 114 generates signal PWM1 for controlling inverter 20 based on the voltage instruction obtained by superposing the harmonic voltage instruction from harmonic generation unit 112 equally on the U-phase, V-phase and W-phase voltage instructions from conversion unit 110. Accordingly, the harmonic of the counter-electromotive force generated at neutral point N1 when motor-generator MG1 revolves is suppressed. Therefore, even though motor-generator MG1 is revolving, the commercial AC voltage of which distortion is suppressed can be supplied to the load device connected to connector 50.

In particular, even if the IPM-type three-phase AC synchronous motor in which the harmonic noticeably appears in the potential of the neutral point is used as motor-generator MG1, the commercial AC voltage of which distortion is effectively suppressed can be generated and supplied to the load device.

According to the first embodiment, the commercial AC voltage is generated across neutral points N1, N2 and output to the load device. Therefore, it is not necessary to separately provide a dedicated inverter for generating the commercial AC voltage.

Moreover, as harmonic generation unit 112 can be configured with software, the AC voltage of which distortion is suppressed can be supplied to the load device without commercial additional special hardware.

Second Embodiment

Figure 6:
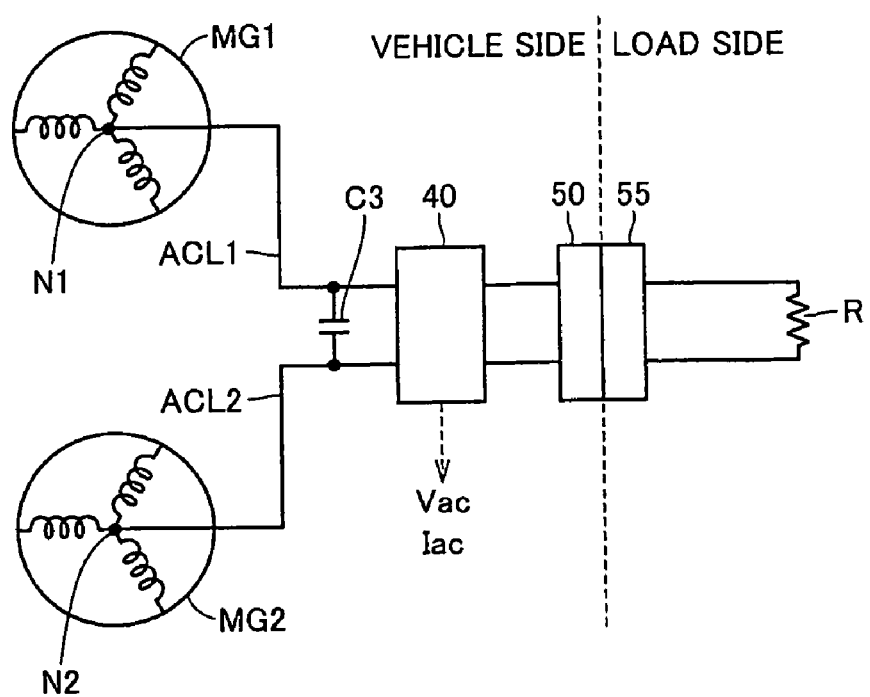
FIG. 6 illustrates an output circuit outputting to a load device a commercial AC voltage generated across the neutral points in the AC voltage output apparatus shown in FIG. 1.

FIG. 6 illustrates the output circuit outputting to the load device the commercial AC voltage generated across neutral points N1, N2 in AC voltage output apparatus 100 shown in FIG. 1. Referring to FIG. 6, in the output circuit, capacitor C3 is connected between AC output lines ACL1, ACL2. Capacitor C3 serves to eliminate influence of ripple to the load device (load R) connected to connector 50 through an outlet 55.

On the other hand, if capacitor C3 is provided, an LC circuit is formed by the coil of motor-generators MG1, MG2 and capacitor C3. As described so far, when motor-generator MG1 revolves, the harmonic of the counter-electromotive force appears in the potential of neutral point N1. Here, if a component having a frequency in the vicinity of the resonance frequency of the LC circuit is present in the harmonic component, the output circuit (LC circuit) resonates at the resonance frequency and the amplitude of the harmonic component having the frequency in the vicinity of the resonance frequency becomes greater. In particular, if the load of the load device (load R) is light, resonance is noticeable, which adversely affects the load device.

Accordingly, in the second embodiment, during the light load state in which resonance of the output circuit is noticeable, the harmonic generation unit generates the harmonic voltage instruction having the phase opposite to the harmonic component having the frequency in the vicinity of the resonance frequency, so that amplification of the harmonic component in the vicinity of the resonance frequency can be suppressed.

An AC voltage output apparatus 100A according to the second embodiment includes a control device 60A instead of control device 60 in the configuration of AC voltage output apparatus 100 according to the first embodiment shown in FIG. 1.

Figure 7:
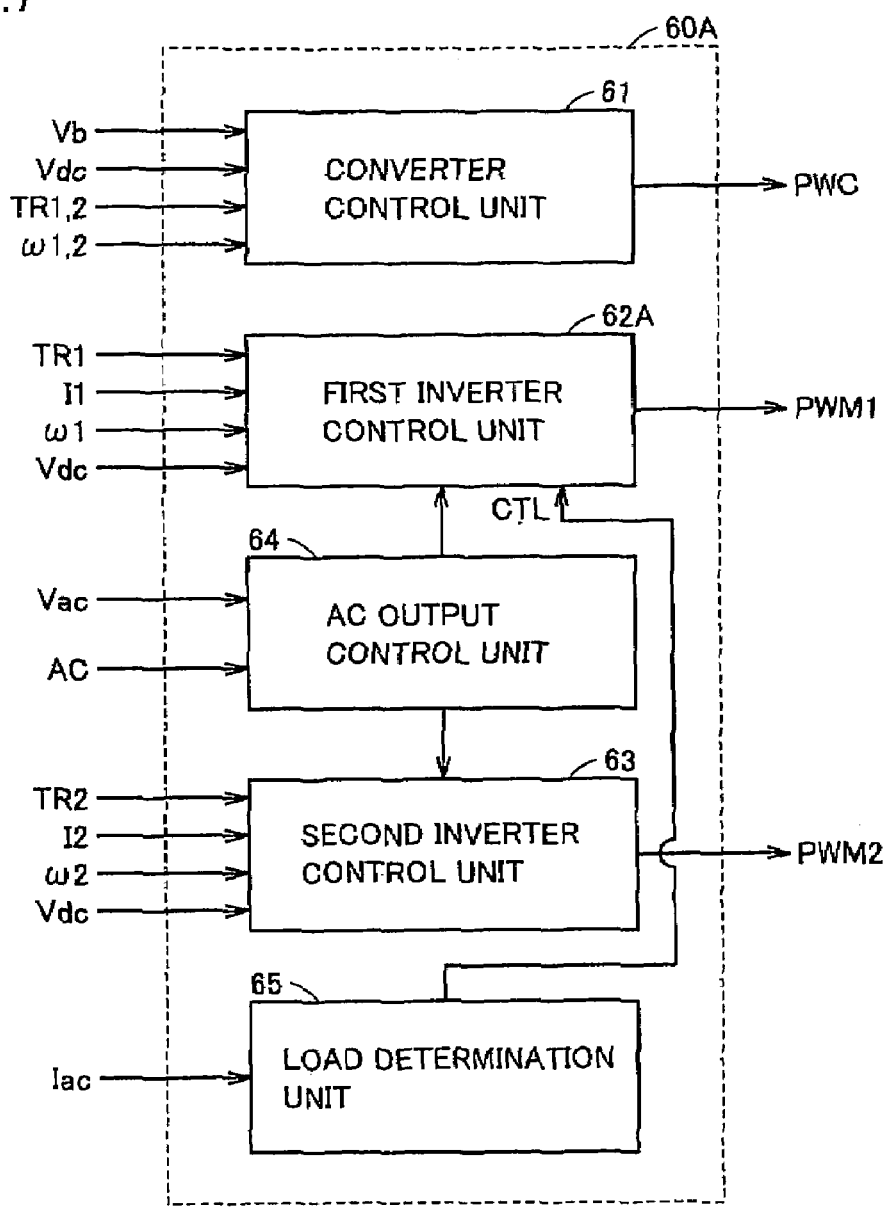
FIG. 7 is a functional block diagram of a control device according to a second embodiment of the present invention.

FIG. 7 is a functional block diagram of control device 60A in the second embodiment of the present invention. Referring to FIG. 7, control device 60A further includes a load determination unit 65 in the configuration of control device 60 in the first embodiment shown in FIG. 2 and includes a first inverter control unit 62A instead of first inverter control unit 62.

Load determination unit 65 receives AC current Iac detected by AC port 40. When AC current Iac is smaller than a reference value set in advance, load determination unit 65 determines that the load of the load device connected to connector 50 is light, and generates a signal CTL at H level and outputs the signal to first inverter control unit 62A. On the other hand, when AC current Iac is not smaller than the reference value, load determination unit 65 determines that the load of the load device connected to connector 50 is not light, and generates signal CTL at L level and outputs the signal to first inverter control unit 62A.

First inverter control unit 62A generates signal PWM1 for turning on/off power transistors Q11 to Q16 of inverter 20 based on torque control value TR1, motor current I1, motor revolution number $\omega 1$, system voltage Vdc, and signal CTL from load determination unit 65, and outputs generated signal PWM1 to inverter 20.

The configuration of control device 60A shown in FIG. 7 is otherwise the same as that of control device 60 in the first embodiment shown in FIG. 2.

Figure 8:
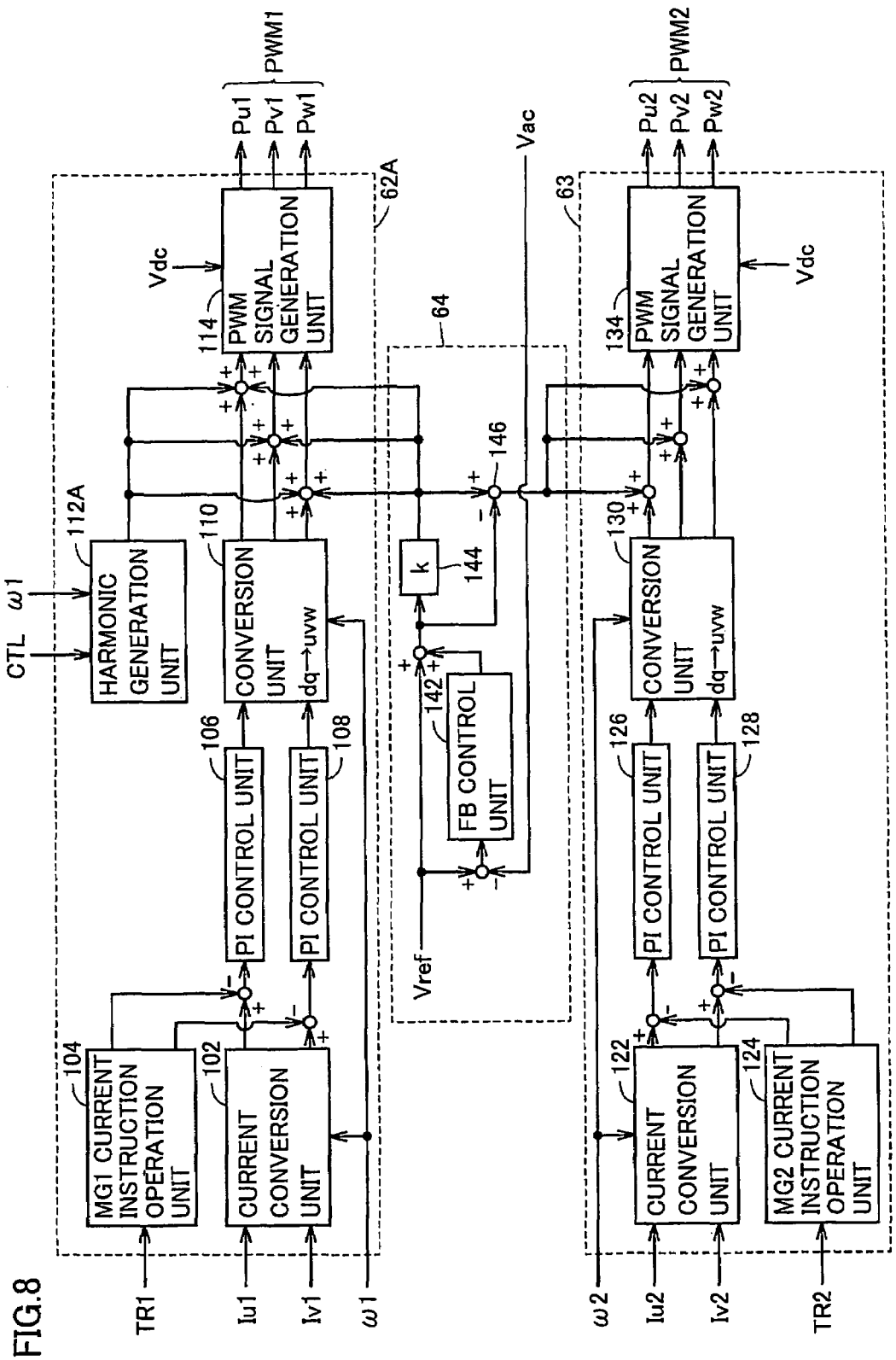
FIG. 8 is a functional block diagram showing in detail first and second inverter control units and an AC output control unit shown in FIG. 7.

FIG. 8 is a functional block diagram showing in detail first and second inverter control units 62A, 63 and AC output control unit 64 shown in FIG. 7. Referring to FIG. 8, first inverter control unit 62A includes a harmonic generation unit 112A instead of harmonic generation unit 112 in the configuration of first inverter control unit 62 in the first embodiment shown in FIG. 3.

Harmonic generation unit 112A receives motor revolution number $\omega 1$ and signal CTL from load determination unit 65. Then, when signal CTL is at H level and $\omega 1 \neq 0$, harmonic generation unit 112A generates harmonic voltage instruction $e_{GN}$ based on motor revolution number $\omega 1$, as shown in the following equation.

$$e_{GN} = -e_{M9} \sin 9\omega_1 t \quad (7)$$

Specifically, in the second embodiment, while engine ENG connected to motor-generator MG1 operates at a prescribed engine speed (for example, engine speed during idle) and motor-generator MG1 is revolving accordingly at motor revolution number $\omega 1$, the frequency of the ninth-order harmonic of the counter-electromotive force generated by motor-generator MG1 is present in the vicinity of the resonance frequency of the output circuit. Therefore, harmonic generation unit 112A generates harmonic voltage instruction $e_{GN}$ containing the ninth-order harmonic based on Equation (7) above.

The configuration of first inverter control unit 62A is otherwise the same as that of first inverter control unit 62 in the first embodiment shown in FIG. 3.

Figure 9:
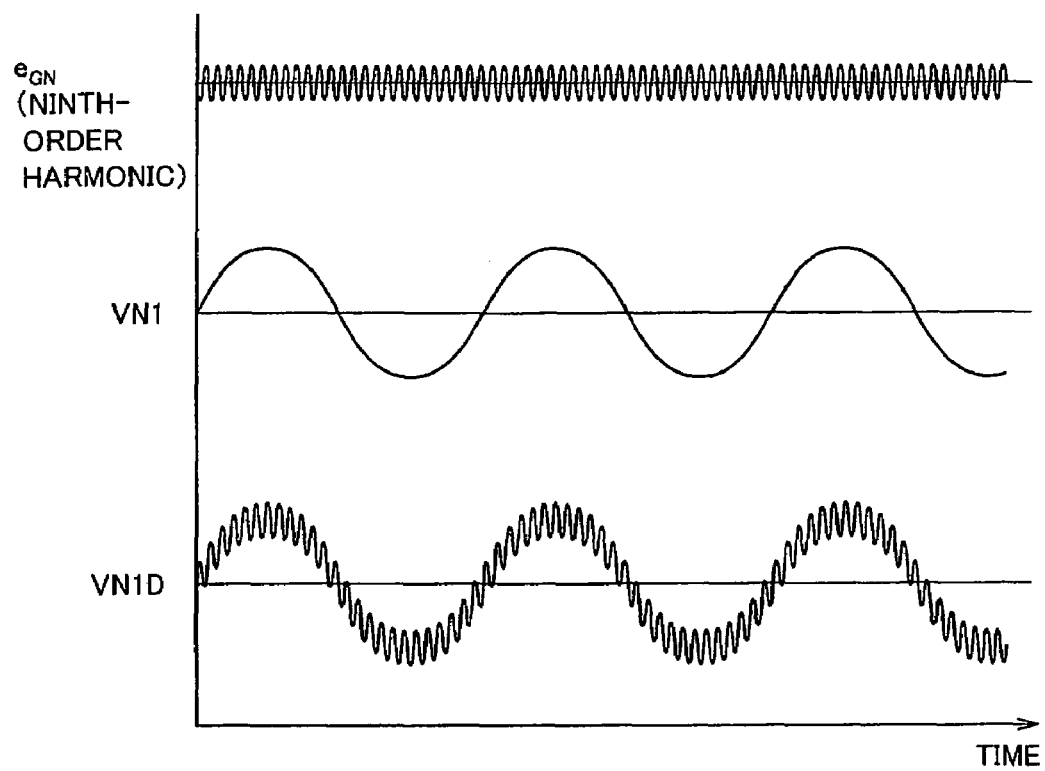
FIG. 9 is a waveform diagram of a potential of a neutral point of a motor-generator and a harmonic voltage instruction generated by a harmonic generation unit shown in FIG. 8.

FIG. 9 is a waveform diagram of potential VN1 of neutral point N1 of motor-generator MG1 and the harmonic voltage instruction generated by harmonic generation unit 112A shown in FIG. 8. For the sake of comparison, FIG. 9 shows potential VN1D of neutral point N1 when voltage compensation by harmonic generation unit 112A is not performed.

Referring to FIG. 9, harmonic generation unit 112A generates harmonic voltage instruction $e_{GN}$ having the phase opposite to the ninth-order harmonic of the counter-electromotive force generated by motor-generator MG1, based on motor revolution number $\omega 1$ of motor-generator MG1 and using Equation (7) above. The amplitude of generated harmonic voltage instruction $e_{GN}$ (that is, constant $e_{G9}$ in Equation (7)) is determined, for example, based on the value of the counter-electromotive force measured in advance in the no-load state of motor-generator MG1. It is noted that the amplitude of harmonic voltage instruction $e_{GN}$ may be varied depending on magnitude of the load of the load device receiving supply of the commercial AC voltage. For example, as the load of the load device is smaller, the amplitude of harmonic voltage instruction $e_{GN}$ may be greater.

Then, the voltage instruction obtained by adding the AC voltage instruction from AC output control unit 64 equally to U-phase, V-phase and W-phase voltage instructions from conversion unit 110 and by superposing harmonic voltage instruction $e_{GN}$ from harmonic generation unit 112A on the result of addition equally for each phase is used as the final voltage instruction of inverter 20. If voltage compensation by harmonic generation unit 112A is not performed, the resonant ninth-order harmonic appears in the potential of neutral point N1 as shown with potential VN1D. In the second embodiment of the present invention, however, the ninth-order harmonic of the counter-electromotive force is suppressed by harmonic voltage instruction $e_{GN}$ as shown with potential VN1 and the harmonic hardly appears in potential VN1.

In the description above, it is assumed that harmonic generation unit 112A generates harmonic voltage instruction $e_{GN}$ containing the ninth-order harmonic, however, harmonic voltage instruction $e_{GN}$ generated by harmonic generation unit 112A is not limited as such. The harmonic voltage instruction of appropriate order should only be generated in accordance with the resonance frequency of the output circuit, that is determined by leakage inductance of motor-generators MG1, MG2 and the size of capacitor C3.

In addition, in the description above, it is assumed that load determination unit 65 determines whether the load of the load device is light or not based on magnitude of AC current Iac, however, it may be determined based on AC voltage Vac. Specifically, as the load of the load device receiving supply of the commercial AC voltage is greater, fluctuation (variation) of AC voltage Vac becomes greater due to voltage lowering. Therefore, when fluctuation of AC voltage Vac is smaller than a reference value set in advance, it can be determined that the load of the load device is light.

Alternatively, determination as to whether the load of the load device is light may be made based on a phase difference between AC voltage Vac and AC current Iac. Specifically, as the load of the load device receiving supply of the commercial AC voltage is smaller, the phase difference between AC voltage Vac and AC current Iac becomes greater. Therefore, when the phase difference is greater than a reference value set in advance, it can be determined that the load of the load device is light.

As described above, according to the second embodiment, influence of ripple to the load device receiving supply of the commercial AC voltage through AC output lines ACL1, ACL2 can be suppressed, because capacitor C3 is connected between AC output lines ACL1, ACL2.

When capacitor C3 is provided, the LC circuit (resonant circuit) is formed in the output circuit. Here, as harmonic generation unit 112A generates harmonic voltage instruction $e_{GN}$ having the phase opposite to the harmonic component having the frequency in the vicinity of the resonance frequency of the output circuit, resonance of the output circuit is suppressed. Therefore, the commercial AC voltage of which distortion due to resonance of the output circuit is suppressed can be supplied to the load device.

In general, resonance of the output circuit noticeably appears when the load of the load device (load R) is light. Accordingly, in the second embodiment, load determination unit 65 determines whether the load of the load device is light or not based on generated AC current Iac or the like, and harmonic generation unit 112A generates harmonic voltage instruction $e_{GN}$ based on the result of determination only when the load is light. Therefore, distortion of the commercial AC voltage can efficiently be suppressed.

Third Embodiment

In the first and second embodiments described above, generation of the commercial AC voltage is premised on a condition that the vehicle is stopped. In a third embodiment, the commercial AC voltage of which distortion is small can be generated and supplied to the load device even during running of the vehicle.

An AC voltage output apparatus 100B according to the third embodiment includes a control device 60B instead of control device 60 in the configuration of AC voltage output apparatus 100 according to the first embodiment shown in FIG. 1. Control device 60B includes a second inverter control unit 63A instead of second inverter control unit 63 in the configuration of control device 60 in the first embodiment shown in FIG. 2.

Figure 10:
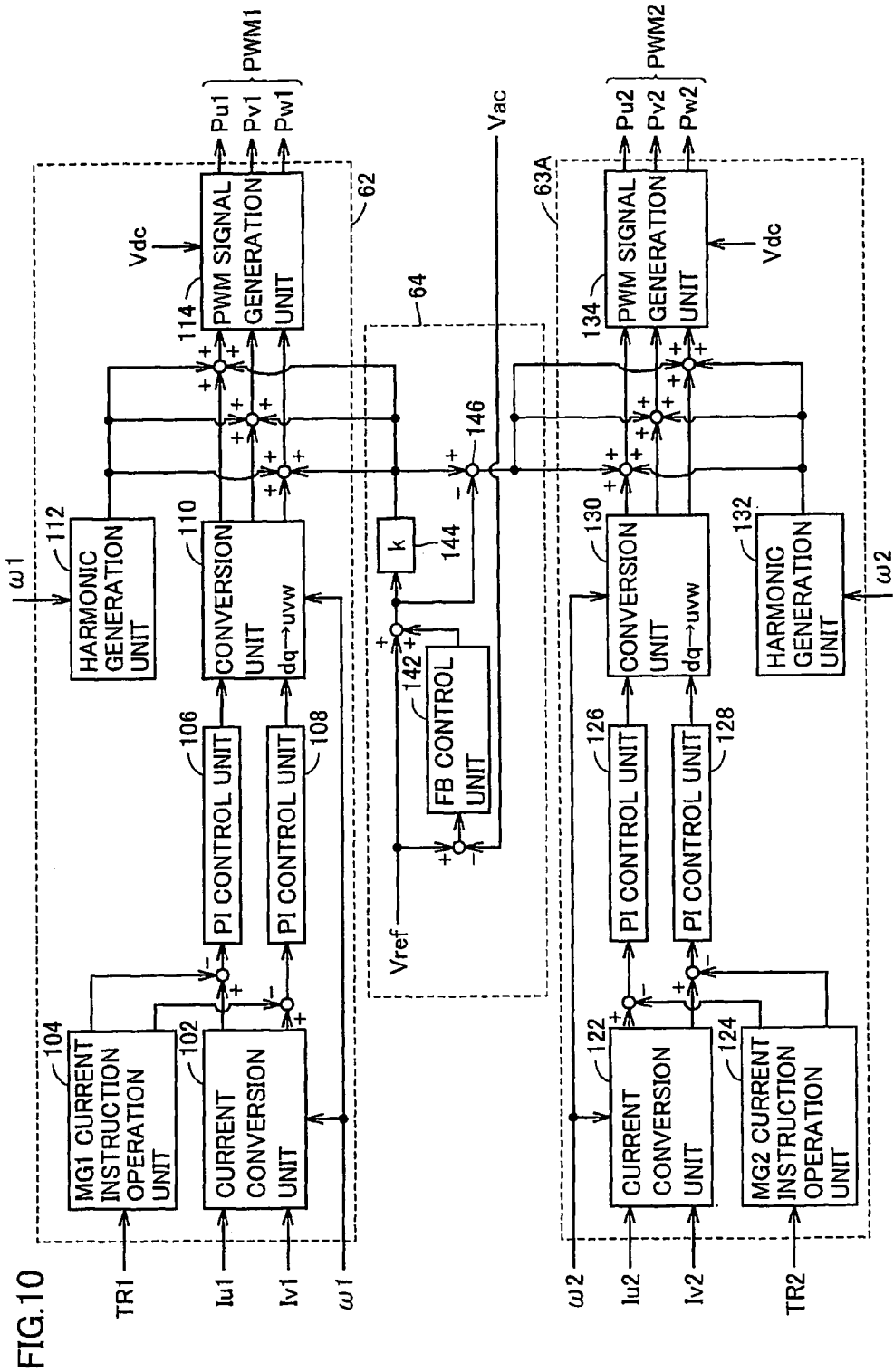
FIG. 10 is a functional block diagram showing in detail first and second inverter control units and an AC output control unit according to a third embodiment of the present invention.

FIG. 10 is a functional block diagram showing in detail first and second inverter control units 62, 63A and AC output control unit 64 in the third embodiment of the present invention. Referring to FIG. 10, second inverter control unit 63A further includes a harmonic generation unit 132 in the configuration of second inverter control unit 63 in the first embodiment shown in FIG. 3.

Harmonic generation unit 132 receives motor revolution number ω2. While ω2≠0, that is, while motor-generator MG2 is revolving, harmonic generation unit 132 generates a harmonic voltage instruction $e_{MN}$ based on motor revolution number ω2, as shown in the following equation.

$$e_{MN} = -e_{M3} \sin 3\omega_2 t - e_{M6} \sin 6\omega_2 t - e_{M9} \sin 9\omega_2 t - \quad (8)$$

Here, $e_{M3}$, $e_{M6}$, $e_{M9}$ ... are constants determined specific to motor-generator MG2. In the third embodiment, generation of the commercial AC voltage is allowed even during running of the vehicle. Therefore, when motor-generator MG2 revolves, the harmonic component of order of multiple of 3 of counter-electromotive force appears in neutral point N2, as in the case of motor-generator MG1. Accordingly, in the third embodiment, the harmonic that may be generated at neutral point N2 is suppressed in such a manner that harmonic generation unit 132 generates harmonic voltage instruction $e_{MN}$ having the phase opposite to the 3nth-order harmonic using Equation (8) above, and generated harmonic voltage instruction $e_{MN}$ is superposed on the U-phase, V-phase and W-phase voltage instructions from conversion unit 130.

It is noted that harmonic voltage instruction $e_{MN}$ may contain solely the third-order harmonic component as shown in the equation below, in view of the fact that the lower-order harmonic component is generally dominant relative to the higher-order harmonic component in motor-generator MG2, as in the case of motor-generator MG1.

$$e_{MN} = -e_{M3} \sin 3\omega_2 t \quad (9)$$

The configuration of second inverter control unit 63A is otherwise the same as that of second inverter control unit 63 in the first embodiment shown in FIG. 3.

As described above, according to the third embodiment, the commercial AC voltage can be generated across neutral point N1 of three-phase coil 12 of motor-generator MG1 and neutral point N2 of three-phase coil 14 of motor-generator MG2. In addition, not only harmonic generation unit 112 generating the harmonic voltage instruction having the phase opposite to the harmonic of the counter-electromotive force generated at neutral point N1 when motor-generator MG1 revolves, but also harmonic generation unit 132 generating the harmonic voltage instruction having the phase opposite to the harmonic of the counter-electromotive force generated at neutral point N2 when motor-generator MG2 revolves are provided. Accordingly, even when both of motor-generators MG1, MG2 are revolving, the harmonics of the counter-electromotive forces generated at neutral points N1, N2 are suppressed. Therefore, even if both of motor-generators MG1, MG2 are revolving, the commercial AC voltage of which distortion is suppressed can be supplied to the load device connected to connector 50.

In the first to third embodiments described above, it is assumed that harmonic generation units 112, 112A corresponding to motor-generator MG1 generate harmonic voltage instruction $e_{GN}$ while motor revolution number ω1 is not 0 (ω1≠0), that is, while motor-generator MG1 is revolving. Harmonic voltage instruction $e_{GN}$, however, may be generated also when engine ENG is operating. Whether or not engine ENG is operating can be determined based on a signal from an engine ECU controlling the engine.

In addition, in the first to third embodiments described above, a secondary battery is employed as battery B, however, a fuel cell may be employed instead of the secondary battery. Moreover, an example in which the AC voltage output apparatus according to the present invention is incorporated in a hybrid vehicle has been described above, however, the present invention is applicable to an AC voltage output apparatus mounted on an electric vehicle or a fuel cell vehicle.

Further, in the description above, AC voltage output apparatuses 100, 100A, 100B include boost converter 16, however, the present invention is applicable also to a system without boost converter 10.

In the description above, motor-generators MG1, MG2 correspond to the "first polyphase AC motor" and the "second polyphase AC motor" of the present invention respectively, and three-phase coils 12, 14 correspond to the "first polyphase winding" and the "second polyphase winding" of the present invention respectively. Inverters 20, 30 correspond to the "first inverter" and the "second inverter" of the present invention respectively, and first inverter control units 62, 62A, second inverter control units 63, 63A, and AC output control unit 64 implement the "control device" of the present invention. In addition, harmonic generation units 112, 112A correspond to the "harmonic generation unit" of the present invention, and PWM signal generation unit 114 corresponds to the "signal generation unit" of the present invention.

Moreover, the output circuit shown in FIG. 6 corresponds to the "output circuit" of the present invention, and AC output lines ACL1, ACL2 correspond to the "first output line" and the "second output line" of the present invention respectively. Capacitor C3 corresponds to the "capacitor" of the present invention, and load determination unit 65 corresponds to the "load determination unit" of the present invention. In addition, engine ENG corresponds to the "internal combustion engine" of the present invention, and drive wheel DW corresponds to the "drive wheel" of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. An AC voltage output apparatus, comprising:
a first polyphase AC motor including a star-connected first polyphase winding as a stator winding;
a second polyphase AC motor including a star-connected second polyphase winding as a stator winding;
first and second inverters connected to said first and second polyphase windings respectively; and
a control device controlling said first and second inverters such that an AC voltage having a prescribed frequency is generated across a neutral point of said first polyphase winding and a neutral point of said second polyphase winding when a rotor of said second polyphase AC motor is stopped; wherein
said control device includes
a harmonic generation unit generating a harmonic voltage instruction having a phase opposite to a harmonic of counter-electromotive force generated at the neutral point of said first polyphase winding, based on number of revolutions of said first polyphase AC motor when a rotor of said first polyphase AC motor revolves, and
a signal generation unit generating a control signal for controlling said first inverter based on a voltage instruction obtained by superposing said harmonic voltage instruction onto a voltage instruction of each phase of said first polyphase AC motor and outputting the generated control signal to said first inverter.

2. The AC voltage output apparatus according to claim 1, wherein
said first polyphase AC motor includes a permanent magnet type three-phase AC synchronous motor, and
said harmonic generation unit generates the harmonic voltage instruction having a phase opposite to a 3nth-order harmonic component (n is a natural number) of said counter-electromotive force.

3. The AC voltage output apparatus according to claim 2, wherein
said harmonic generation unit generates the harmonic voltage instruction having a phase opposite to a third-order harmonic component of said counter-electromotive force.

4. The AC voltage output apparatus according to claim 1, further comprising an output circuit configured to output the AC voltage generated across the neutral point of said first polyphase winding and the neutral point of said second polyphase winding to a load device receiving supply of said AC voltage, wherein
said harmonic generation unit generates the harmonic voltage instruction having a phase opposite to a harmonic component having a frequency in vicinity of a resonance frequency of said output circuit.

5. The AC voltage output apparatus according to claim 4, wherein
said output circuit includes
a first output line having one end connected to the neutral point of said first polyphase winding and another end connected to an output terminal to which said load device is connected,
a second output line having one end connected to the neutral point of said second polyphase winding and another end connected to said output terminal, and
a capacitor connected between said first output line and said second output line, and
a resonance frequency of said output circuit is determined specific to an LC circuit formed by said first and second polyphase windings and said capacitor.

6. The AC voltage output apparatus according to claim 4, further comprising a load determination unit determining whether load of said load device is smaller than a reference value set in advance, wherein
said harmonic generation unit generates said harmonic voltage instruction when said load determination unit determines that said load is smaller than said reference value.

7. The AC voltage output apparatus according to claim 4, wherein
said first polyphase AC motor includes a permanent magnet type three-phase AC synchronous motor, and
said harmonic generation unit generates the harmonic voltage instruction having a phase opposite to a ninth-order harmonic component having a frequency in vicinity of said resonance frequency.

8. A hybrid vehicle comprising:
the AC voltage output apparatus according to claim 1;
an internal combustion engine coupled to said first polyphase AC motor and providing rotational torque to said first polyphase AC motor; and
a drive wheel coupled to said second polyphase AC motor and receiving rotational torque from said second polyphase AC motor.

9. An AC voltage output apparatus, comprising:
a first polyphase AC motor including a star-connected first polyphase winding as a stator winding;
a second polyphase AC motor including a star-connected second polyphase winding as a stator winding;
first and second inverters connected to said first and second polyphase windings respectively; and a control device controlling said first and second inverters such that an AC voltage having a prescribed frequency is generated across a neutral point of said first polyphase winding and a neutral point of said second polyphase winding; wherein said control device includes a first harmonic generation unit generating a first harmonic voltage instruction having a phase opposite to a harmonic of counter-electromotive force generated at the neutral point of said first polyphase winding, based on number of revolutions of said first polyphase AC motor when a rotor of said first polyphase AC motor revolves, a first signal generation unit generating a control signal for controlling said first inverter based on a voltage instruction obtained by superposing said first harmonic voltage instruction onto a voltage instruction of each phase of said first polyphase AC motor and outputting the generated control signal to said first inverter, a second harmonic generation unit generating a second harmonic voltage instruction having a phase opposite to a harmonic of counter-electromotive force generated at the neutral point of said second polyphase winding, based on number of revolutions of said second polyphase AC motor when a rotor of said second polyphase AC motor revolves, and a second signal generation unit generating a control signal for controlling said second inverter based on a voltage instruction obtained by superposing said second harmonic voltage instruction onto a voltage instruction of each phase of said second polyphase AC motor and outputting the generated control signal to said second inverter.

10. An AC voltage output apparatus, comprising:

a first polyphase AC motor including a star-connected first polyphase winding as a stator winding;

a second polyphase AC motor including a star-connected second polyphase winding as a stator winding;

first and second inverters connected to said first and second polyphase windings respectively; and control means for controlling said first and second inverters such that an AC voltage having a prescribed frequency is generated across a neutral point of said first polyphase winding and a neutral point of said second polyphase winding when a rotor of said second polyphase AC motor is stopped; wherein said control means includes harmonic generation means for generating a harmonic voltage instruction having a phase opposite to a harmonic of counter-electromotive force generated at the neutral point of said first polyphase winding, based on number of revolutions of said first polyphase AC motor when a rotor of said first polyphase AC motor revolves, and signal generation means for generating a control signal for controlling said first inverter based on a voltage instruction obtained by superposing said harmonic voltage instruction onto a voltage instruction of each phase of said first polyphase AC motor and outputting the generated control signal to said first inverter.

11. The AC voltage output apparatus according to claim 10, wherein said first polyphase AC motor includes a permanent magnet type three-phase AC synchronous motor, and said harmonic generation means generates the harmonic voltage instruction having a phase opposite to a 3nth-order harmonic component (n is a natural number) of said counter-electromotive force.

12. The AC voltage output apparatus according to claim 11, wherein said harmonic generation means generates the harmonic voltage instruction having a phase opposite to a third-order harmonic component of said counter-electromotive force.

13. The AC voltage output apparatus according to claim 10, further comprising an output circuit configured to output the AC voltage generated across the neutral point of said first polyphase winding and the neutral point of said second polyphase winding to a load device receiving supply of said AC voltage, wherein said harmonic generation means generates the harmonic voltage instruction having a phase opposite to a harmonic component having a frequency in vicinity of a resonance frequency of said output circuit.

14. The AC voltage output apparatus according to claim 13, wherein said output circuit includes a first output line having one end connected to the neutral point of said first polyphase winding and another end connected to an output terminal to which said load device is connected, a second output line having one end connected to the neutral point of said second polyphase winding and another end connected to said output terminal, and a capacitor connected between said first output line and said second output line, and a resonance frequency of said output circuit is determined specific to an LC circuit formed by said first and second polyphase windings and said capacitor.

15. The AC voltage output apparatus according to claim 13, further comprising load determination means for determining whether load of said load device is smaller than a reference value set in advance, wherein said harmonic generation means generates said harmonic voltage instruction when said load determination means determines that said load is smaller than said reference value.

16. The AC voltage output apparatus according to claim 13, wherein said first polyphase AC motor includes the permanent magnet type three-phase AC synchronous motor, and said harmonic generation means generates the harmonic voltage instruction having a phase opposite to a ninth-order harmonic component having a frequency in vicinity of said resonance frequency.

17. An AC voltage output apparatus, comprising:

a first polyphase AC motor including a star-connected first polyphase winding as a stator winding;

a second polyphase AC motor including a star-connected second polyphase winding as a stator winding;

first and second inverters connected to said first and second polyphase windings respectively; and control means for controlling said first and second inverters such that an AC voltage having a prescribed frequency is generated across a neutral point of said first polyphase winding and a neutral point of said second polyphase winding; wherein said control means includes first harmonic generation means for generating a first harmonic voltage instruction having a phase opposite to a harmonic of counter-electromotive force generated at the neutral point of said first polyphase winding, based on number of revolutions of said first polyphase AC motor when a rotor of said first polyphase AC motor revolves, first signal generation means for generating a control signal for controlling said first inverter based on a voltage instruction obtained by superposing said first harmonic voltage instruction onto a voltage instruction of each phase of said first polyphase AC motor and outputting the generated control signal to said first inverter, second harmonic generation means for generating a second harmonic voltage instruction having a phase opposite to a harmonic of counter-electromotive force generated at the neutral point of said second polyphase winding, based on number of revolutions of said second polyphase AC motor when a rotor of said second polyphase AC motor revolves, and second signal generation means for generating a control signal for controlling said second inverter based on a voltage instruction obtained by superposing said second harmonic voltage instruction onto a voltage instruction of each phase of said second polyphase AC motor and outputting the generated control signal to said second inverter.

\* \* \* \* \*